July 26, 1932.  R. B. WOLFORD  1,869,293

FISHHOOK

Filed July 31, 1931

R. B. Wolford,
INVENTOR

BY Victor J. Evans and Co. ATTORNEY

WITNESS:

Patented July 26, 1932

1,869,293

UNITED STATES PATENT OFFICE

RILEY B. WOLFORD, OF JOHNSTOWN, PENNSYLVANIA

FISHHOOK

Application filed July 31, 1931. Serial No. 554,318.

This invention relates to fish hooks and has for the primary object, the provision of a device which will be humane and not to any great degree injure a fish when caught so as to impair the life of the fish should it be desired to return the fish to the water and which will render the escape of the fish from the hook practically impossible.

Another object of this invention is the provision of a movable barb or securing element which will permit the bill of the hook to easily penetrate the flesh of the fish and will retard or prevent the bill from working out of the flesh until manually operated, consequently preventing the escape of the fish after once caught.

A further object of this invention is the provision of a fish hook of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a fish hook constructed in accordance with my invention.

Figure 1:
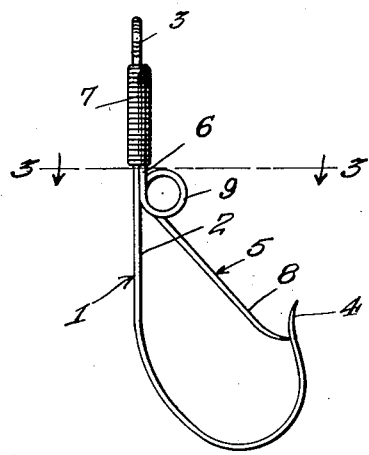
Figure 2:
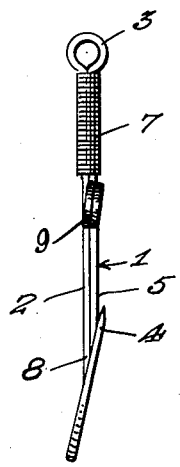
Figure 2 is an edge elevation illustrating the same.
Figure 3:
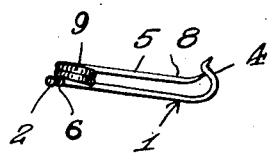
Figure 3 is a sectional view taken on the line 3—3 of Figure 1.
Figure 4:
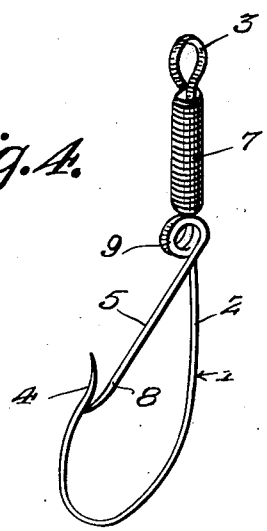
Figure 4 is a perspective view illustrating the hook.

Referring in detail to the drawing, the numeral 1 indicates in entirety a fish hook including a shank 2 having one end bent to form an eye 3 to which a fishing line may be attached. The opposite end of the shank 2 is curved upon itself to form a bill 4 spaced a considerable distance from the shank 2. The bill 4 is tapered toward its free end and curved slightly outwardly from the shank and is minus the usual barb.

A movable securing element or barb 5 is associated with the bill 4 adjacent the free end of the latter and includes an attaching portion 6 extending parallel with the shank 2 adjacent to the eye and secured to said shank in any suitable manner, such as, welding or wrapping as shown at 7 in the official drawing. The securing element beyond the attaching portion is bent angularly to provide a flexible portion 8, the free end of which is pointed and slightly curved toward the free end of the bill 4. The flexible portion 8 is capable of flexing inwardly toward the shank or laterally thereof so as to permit the bill to easily penetrate the flesh of a fish and any tendency of the fish to move off the bill is prevented by the pointed end with the flexible portion biting into the flesh of the fish. If desired the barb or securing element between the attaching portion 6 and the flexible portion 8 may be coiled as shown at 9 to provide a spring action for the flexible portion. The coils may be of any number and the tendency is to urge the pointed end of the flexible portion toward the bill of the hook. By referring to Figure 1 it will be noted that the pointed end of the flexible portion 8 is positioned normally inwardly of the free end of the bill so that the latter may easily enter the flesh of a fish. After a fish has been caught upon the bill its escape therefrom is prevented by the movable barb or securing element 5 and by manually moving the flexible portion 8 of the barb or securing element 5 inwardly or laterally away from the bill the latter may be easily extracted from the fish without tearing or injuring the fish to an extent that the life of the fish would be impaired.

From the foregoing description taken in connection with the accompanying drawing, it will be noted that a very efficient fish hook has been provided wherein a fish may be easily caught thereon and retained without undue injury until manually released. The manual releasing of the fish may be accomplished without tearing or injuring the fish to a degree that would impair the life of the fish. A hook of this kind is extremely desirable due to the number of fish that may be caught which are undersize or illegal and which must be returned to the water and with the conventional type of hook such fish are usually injured to such an extent that their life is impaired.

While I have shown and described the preferred embodiment of my invention, it will be understood that minor changes in construction, combination and arrangement of parts may be made without departing from the spirit and scope of my invention, as claimed.

Having thus described my invention, what I claim is:

A fishing hook comprising a shank, a bill on said shank and having a pointed free end curved outwardly and laterally of the shank, a movable barb including a flexible portion and an attaching portion and said attaching portion engaging the shank and secured thereto, said flexible portion extending diagonally from the shank and having the free end pointed and curved towards the bill to engage said bill inwardly of the free end thereof, said barb between said flexible and attaching portions coiled to urge the pointed end of the flexible portion into engagement with the bill.

In testimony whereof I affix my signature.

RILEY B. WOLFORD.